A. W. FERGUSON.
CULTIVATOR.
APPLICATION FILED FEB. 20, 1913.
1,098,563.
Patented June 2, 1914.
2 SHEETS—SHEET 1.
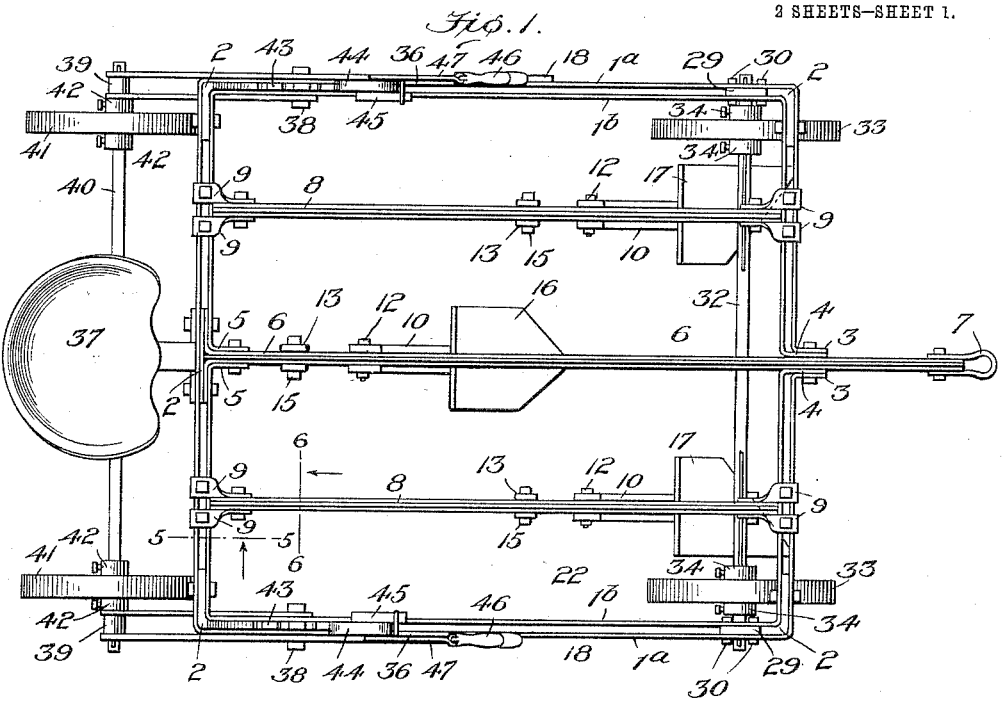
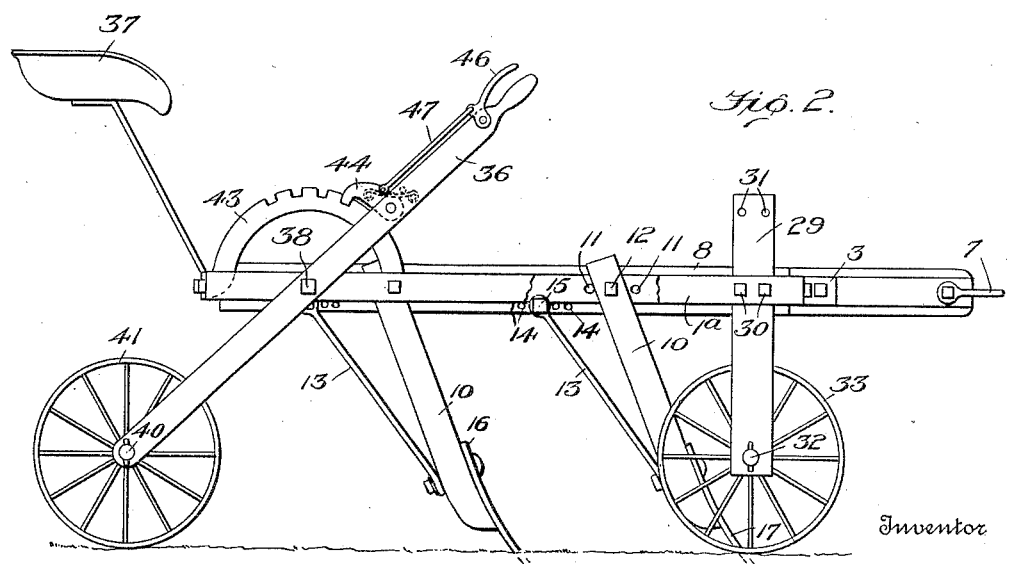

A. W. FERGUSON.
CULTIVATOR.
APPLICATION FILED FEB. 20, 1913.
1,098,563.
Patented June 2, 1914.
2 SHEETS—SHEET 2.
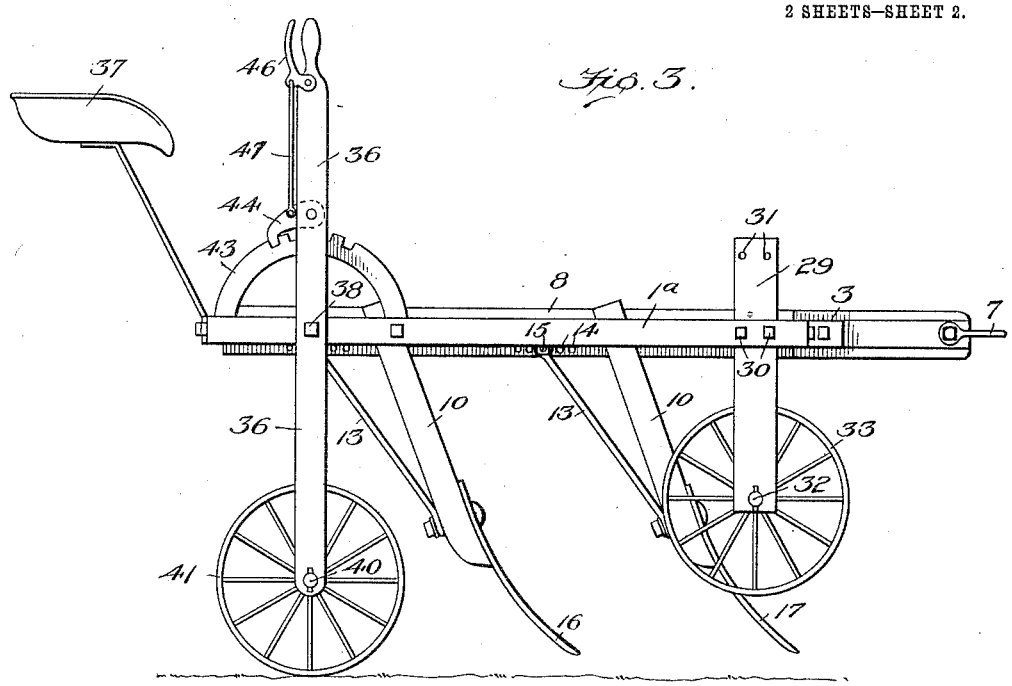
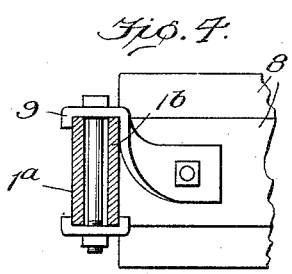
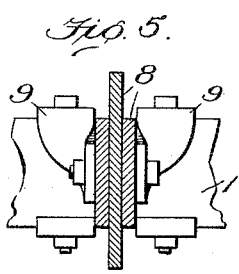
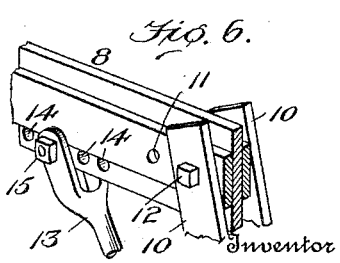

UNITED STATES PATENT OFFICE.

ARTHUR W. FERGUSON, OF MONTGOMERY, ALABAMA.

CULTIVATOR.

1,098,563.  Specification of Letters Patent.  Patented June 2, 1914.

Application filed February 20, 1913. Serial No. 749,696.

*To all whom it may concern:*

Be it known that I, ARTHUR W. FERGUSON, a citizen of the United States, residing at Montgomery, in the county of Montgomery and State of Alabama, have invented certain new and useful Improvements in Cultivators; and I do hereby declare the following to be a full, clear, and exact description of the invention, such as will enable others skilled in the art to which it appertains to make and use the same.

My invention relates to agricultural implements, but more particularly to improvements in cultivators, and has for its object the production of a cultivator which is peculiarly simple and durable in construction, easily controlled and most efficient in its operation, same being adapted, because of the longitudinal and lateral adjustability and interchangeability of its shovels, to perform all of the various operations pertaining to the cultivation of crops, such for example, as cotton or corn.

The invention will be hereinafter particularly described and pointed out in the claims following.

In the accompanying drawings which form part of this application and whereon corresponding numerals refer to like parts in the several views: Figure 1 represents a top plan view of my invention with its cultivator blades or shovels in operative position. Fig. 2 is a side elevation of parts shown by Fig. 1. Fig. 3 is a view corresponding with Fig. 2 except that the blades or shovels are here shown elevated or lifted from the ground. Fig. 4 is a fragmentary view showing the end of one drag bar or plow beam, and also its supporting frame in section, this view being taken on the line 5—5, Fig. 1, looking in the direction of the arrow. Fig. 5 is also a fragmentary view in end elevation of parts shown by Fig. 5, taken on the line 6—6, Fig. 1, looking in the direction indicated by arrow, and Fig. 6 is a detail perspective of one drag bar or plow beam adjacent to its point or connection with one plow standard and standard brace.

Reference being had to the drawings and numerals thereon, 1 indicates the cultivator frame preferably made of flat bar iron and of double construction in parallel arrangement, the outer and inner frame members 1ª and 1ᵇ respectively being separated at their corners and rear center by space blocks 2 bolted, riveted or otherwise secured in place. By preference these frame members are rectangular in shape the outer one 1ª being unbroken except at its front center where its ends are flanged or angled outwardly as shown at 3, 3. The inner frame member 1ᵇ is made of two parts each angled outwardly at their front as at 4, 4 between the ends 3, 3 of the frame member 1ª, and similarly flanged at their back as at 5, 5, while between these several sets of flanges is securely bolted a control drag bar or plow carrying beam 6 located in the longitudinal center of the frame structure, projecting beyond same at the front and provided with a clevis 7 for the attachment of a draft animal or animals. Upon each side of said central beam 6 are one or more side beams 8 connected front and back to the frame structure by movable clips 9, and secured in place by bolts passing between the frame members 1ª and 1ᵇ as best shown by Fig. 5, so as to render the said side beams laterally adjustable to and from the fixed center beam 6 for purposes which will later appear. The said beams 6 and 8 each comprise a three part or laminated structure, with the central member of greater width than those by which it is flanked, so that the said central member extends above and below as best shown by Figs. 5, and 6.

Depending from each of the longitudinally arranged beams 6, and 8, 8, one upon each, are corresponding plow or cultivator shovel-standards 10, which by preference are given a slight forward rake or slant, and are of bifurcated form straddling at their upper ends their respective plow beams and there secured in one of a series of holes 11, by a through-bolt 12 so as to render them longitudinally adjustable upon their respective plow beams, as shown by Fig. 2 of the drawings. In like manner braces 13, one for each standard, are adjustably secured in holes 14 by agency of their forked upper ends and through-bolts 15, each of said braces being connected at its lower end to the lower end of its respective plow standard all for the purpose of regulating and determining the rake of said standards as occasion requires. To the said standards 10 are detachably secured suitable shares, sweeps or blades, the present drawings showing a central plow standard 10 to which is bolted a straight shovel blade 16 having substantially a wedge shaped or pointed cutting edge, and side standards 10 to which are secured in like manner turn shovel blades 17, 17 having oppositely disposed angular cutting edges as best shown by Fig. 1, all of said blades being thus rendered readily detachable, and capable of being variously interchanged in position to meet varying requirements and cultivator operations, also adjustable laterally as the means of determining the width of furrows.

The cultivator frame at its forward or advance end is provided with metal axle-bearings 29, 29 which are vertically adjustable between the outer and inner members 1ª and 1ᵇ of the frame structure, being retained in their normal working position as shown by bolts 30, or in an adjusted position if desired by the same bolts passing through the auxiliary holes 31 as for transportation purposes. Mounted in these bearings at their lower ends is a front axle 32 upon which are splined front wheels 33, 33, which in turn are laterally adjustable and adapted to be retained in adjusted positions by and between adjustable collars 34 secured to the shaft 32 by suitable set screws.

Upon the rear end of the cultivator frame, and at opposite sides, are hand levers 36, 36 within easy reach from seat 37, these levers are each fulcrumed upon said frame by bolts 38 and are of double construction from said bolt down to their lowermost ends where they are held apart by space blocks 39 and afford suitable bearings for opposite ends of a rear axle 40, upon which are rear wheels 41, 41 mounted like the front wheels in an adjustable manner between the movable collars 42, 42. Rising from the rear corners of the cultivator frame upon opposite sides are segmental racks 43, 43, and bearing upon these are coacting pawls 44, 44 normally held in engagement by springs 45, and pivotally carried by the hand levers 36, 36 aforesaid; upon the upper end of the said levers 36, 36 are also pivotally mounted grab levers 46, 46 each connected with its respective pawl 44 by a connecting rod 47, by agency whereof it may be disengaged from its particular rack, and when both pawls have been thus disengaged it is quite obvious that the entire rear portion of the cultivator may be elevated as the operator pulls upon both levers 36, from the position shown by Fig. 2 to that shown by Fig. 3, to facilitate turning the cultivator or for the purpose of holding or partially withdrawing all shares, sweeps or blades from the ground.

This being a description of my invention in its preferred form of construction it will be understood that various changes of form, arrangement, materials, proportions and combinations of parts may be made and substituted for those shown and described without in the least departing from the spirit of my invention. For example my invention contemplates the employment of three, five, or more plow beams such as 6 and 8 and co-operating parts, but three such beams being herein shown for the purposes of illustration.

The use and operation of my improved cultivator will be quite evident to persons skilled in the art to which it relates, and a detailed statement of operation is therefore believed to be unnecessary. It may be stated, however, that the ready lateral adjustability of the plow beams 6 and 8, the equally effective and self-evident longitudinal adjustability of the shovel standards and shovels themselves, together with the interchangeability of blades, make possible a wide range of usefulness, and adapt this invention to all of the various well-understood cultivating operations, such for example, as listing, bedding out, broadcasting, barring-off, as a sweep for ridging or opening plants in rows. It will also be noted that because of the longitudinal adjustment of standards 10 by agency of holes 11 in their respective plow beams, and because of similar holes 14 to accommodate the supporting braces 13, the angle of entrance of the working blades may be regulated to a nicety, and when occasion arises to withdraw said blades either partially or wholly by action of the operating levers 36 such withdrawal is accomplished not only with great speed and certainty, but at substantially the angle of entrance, and consequently with great ease regardless of the character or condition of the earth under cultivation. And when an operator seated in the seat 37 raises said levers 36 to the vertical position shown by Fig. 3, the cultivator which normally rests and operates upon four wheels is practically converted into a two-wheeled implement, the pull of the draft animal or animals on the clevis 7 causing the front wheels 33 to leave the ground as shown by Fig. 3, which, it will be seen at a glance, greatly facilitates turning. On the other hand should it be desired to proceed overland a considerable distance the front wheels 33 may be lowered while the frame is still in the elevated position shown in Fig. 3, by merely lowering their bearing members 29 until the auxiliary holes 31 are in a position to be engaged by the bolts 30.

Having thus described my invention, what I now claim and desire to secure by Letters Patent is:

1. In a cultivator the combination with a frame comprising spaced parallel bars, having members arranged between and separating said bars at the corners of the frame, of beams arranged within the confines of the frame and secured to the said spaced bars, of the frame at the front and rear thereof, axle bearings positioned between said spaced bars at the front of the frame, wheels journaled in said arms, pivoted levers positioned upon the spaced bars at the rear of the frame, wheels journaled in said pivoted levers, and means for rocking said pivoted levers and holding them in locked position.

2. In a cultivator the combination with a frame comprising spaced parallel bars having members arranged between and separating said bars at the corners thereof, of a central beam secured to and extending from the rear of said spaced bars to the front and a short distance in advance thereof, beams arranged to either side of said central beam having adjustable connections to the said spaced bars at the front and rear of the frame, adjustable axle bearings positioned between said spaced bars at the front of the frame, wheels journaled in said adjustable axle bearings, pivoted levers mounted upon the spaced bars near the rear of the frame, wheels journaled in said pivoted levers, and means for rocking said levers and holding them in locked position.

3. In a cultivator the combination with a frame comprising spaced parallel bars having members arranged between and separating said bars at the corners thereof, of beams arranged within the confines of the frame and adjustably secured to the said spaced parallel bars at the front and rear of the cultivator, axle bearings adjustably secured between said spaced bars at the front of the frame, wheels journaled in said axle bearings, pivoted levers positioned upon said spaced bars at the rear of the frame, wheels journaled in said pivoted levers and means for rocking said pivoted levers including a hand lever formed by the continuation of one of said pivoted levers, a segment, a locking pawl carried by the hand lever and arranged to engage the segment for holding the last-mentioned pivoted levers in locked position.

4. In a cultivator the combination with a frame comprising spaced parallel bars having members arranged between and separating said bars at the corners thereof, of beams arranged within the confines of said frame and adjustably secured to the said spaced parallel bars at the front and rear thereof, cultivator standards adjustable longitudinally upon said beams, braces extending rearwardly secured to said standards and adjustably secured in said beams, axle bearings positioned between said spaced bars at the front of the frame, wheels journaled in said arms, pivoted levers positioned upon the spaced bars at the rear of the frame, wheels journaled in said pivoted levers, and means for rocking said pivoted levers and holding them in locked position.

In testimony whereof I affix my signature, in presence of two subscribing witnesses.

ARTHUR W. FERGUSON.

Witnesses:
 L. L. McCary,
 Mary Hurt.

---

Copies of this patent may be obtained for five cents each, by addressing the "Commissioner of Patents, Washington, D. C."